Patented Oct. 9, 1928.

1,687,410

UNITED STATES PATENT OFFICE.

DUANE E. WEBSTER, OF WORCESTER, MASSACHUSETTS, ASSIGNOR TO NORTON COMPANY, OF WORCESTER, MASSACHUSETTS, A CORPORATION OF MASSACHUSETTS.

RUBBER-BONDED ABRASIVE ARTICLE AND METHOD OF MAKING THE SAME.

No Drawing.   Application filed October 30, 1925.  Serial No. 65,899.

My invention relates to abrasive articles and more particularly to an article made of abrasive grains bonded by rubber, and a method of making the same.

It is well known that abrasive and polishing materials such as crystalline alumina, silicon carbide, corundum, emery, and the like, may be mixed by various means with rubber and sulfur and formed into grinding wheels, sharpening stones and other abrasive and polishing instruments. The usual methods of making these articles involve either mixing the abrasive material with the rubber and sulfur by the use of mixing or calender rolls, or by softening the rubber with gasoline, naphtha, or some other solvent, and mixing with abrasive material in a mechanical mixing machine. This mixture of rubber, sulfur, and abarsive is then rolled into sheets and cut into the shape desired and thereafter vulcanized.

The first of the above mentioned methods has been found unsatisfactory, particularly because of the necessity for passing the abrasive and rubber mixture repeatedly through mixing and calender rolls. The process of rolling the grains into the rubber and of forming a thin sheet of the mixture serves to crush the grains to a much finer size than that originally selected. This may involve a serious disadvantage in cases where it is desired that the grains be of a large coarse size. Also there is a very definite limit to the amount of abrasive material that can be mixed with a given amount of rubber on such mixing rolls and the grinding wheels thus made often contain a larger portion of rubber than is desired.

The use of solvents, such as gasoline or naphtha, has been found to be expensive, as well as to involve considerable fire hazard. Moreover, these solvents are hard to remove from the rubber and so affect detrimentally the hardness of the abrasive article. Furthermore it has not been feasible heretofore, by using the ordinary methods of wheel manufacture, to make a rubber bonded wheel which has a porous and open structure or other desired abrading characteristics.

It is accordingly an object of my invention to overcome these difficulties and to provide a grinding wheel having improved grinding characteristics, and one which may be economically and easily manufactured.

It is a further object of my invention to provide an improved method of making such a rubber bonded abrasive article. Further objects will be apparent in the following disclosure.

In accordance with my invention I have discovered that an abrasive article of this type may be made by the use of rubber latex. This term "rubber latex" means a milky or lactiferous sap or juice obtained from certain plants, such as the *Hevea brasiliensis*, from which rubber is commonly obtained. This latex may include, in addition to rubber particles suspended in liquid, various combined salts, minerals, proteins, resins and the like. The rubber may be coagulated from this milklike sap by means of smoke, acetic acid, heat, or other well known agencies employed in the manufacture of crude rubber.

I have found that by mixing rubber latex with the abrasive grains of selected sizes and then placing the mixture in a mold, the rubber latex may be coagulated and the rubber formed in proper position for bonding the grains together when vulcanized in the presence of sulfur or other suitable vulcanizing agent. In accordance with the invention I may use a large or a small amount of rubber bond and so vary the grinding characteristics of the abrasive article, and I may properly proportion the amount of bond as required by the nature and size of the abrasive ingredients employed to form either a porous or dense article. Suitable vulcanizing agents, such as sulfur, and accelerators, such as hexamethylentetramine, may be employed with the latex to form a desired grade of rubber bond and to carry the vulcanization to completion.

As a specific example of a method of making a grinding wheel I may employ the following ingredients in the proportions specified:—

Silicon carbide abrasive grains_____ 60 lbs.
Rubber latex_____ 20 lbs.
Sulfur_____  4 lbs.
Hexamethylentetramine_____ ½ oz.

The abrasive grains selected may be of any suitable size and are mixed with the other materials in a suitable mechanical mixing machine until the latex and sulfur are thoroughly distributed throughout the mass of abrasive grains. Thereafter a solution of zinc acetate, or other suitable coagulant is added slowly while the mass is being mixed until the latex assumes a rubbery, cheese-like consistency. This mixture is then placed in a suitable mold and is pressed to the desired shape. For this purpose the material may be heated and pressed hot, after which the shaped article is vulcanized by any well known method.

It will, of course, be understood that these materials may be mixed in any desired order. For example, it is feasible to mix the coagulant with the abrasive grains and sulfur and then add the rubber latex to the mixture. Likewise if desired, the sulfur may be melted and the abrasive grains coated with it. Then the resultant mass is cooled and crushed to produce the original abrasive grains, each coated with a small amount of sulfur. This material may be then mixed with latex and coagulated as desired.

An equally feasible method is to mix the abrasive grains, sulfur and latex and then permit the excess latex to drain from the grains, which may be accomplished by screening the material, after which the mixture may be pressed in a hot mold where the heat serves to coagulate the latex. This mass may be thereafter vulcanized.

If desired the rubber latex may be utilized by evaporating until it assumes a thick cream-like consistency. The abrasive grains and sulfur may be incorporated in this thick mass by mixing and the resulting mixture placed in a mold and hot pressed. The mass is then vulcanized in any appropriate manner.

By using rubber latex in accordance with the invention, the abrasive material may be mixed easily with the rubber when in suspended form without using expensive and fire hazardous solvents which are difficult to remove and consequently affect the hardness of the finished article. The original size of the abrasive grains is maintained, whereas, when the abrasive grains are mixed with rubber on calender or mixing rolls the grains are crushed to a considerable extent to a size finer than their original size. This is often a serious disadvantage where coarse abrasive compositions are desired. In accordance with the invention, the amount of bond may be controlled better than in cases where the abrasive is mixed with rubber on mixing rolls, because in the latter case there is a limit to the amount of abrasive that can be mixed with a given amount of rubber. The labor involved in the practice of the invention is less than that utilized in making abrasive articles by the use of either solvents or mixing rolls.

Furthermore, abrasive wheels may be made either dense or porous in accordance with the invention, and the porosity may be controlled within desirable limits depending principally upon the grain size, amount of rubber latex used to coat the grains, and upon the pressure to which the wheel is subjected during shaping. On the other hand it is difficult to make wheels of uniform porosity and texture by mixing abrasive grains with rubber dissolved in a solvent and then evaporating the solvent under reduced atmospheric pressure.

Having thus described my invention, what I claim as new and desire to secure by Letters Patent is:

1. The improvement in the manufacture of rubber bonded abrasive articles comprising mixing rubber latex, a vulcanizing agent and an accelerator, and abrasive grains, coagulating the mixture thus obtained, and thereafter vulcanizing the coagulated mixture.

2. The method of making an abrasive article comprising the steps of mixing abrasive grains with rubber latex, a vulcanizing agent, coagulating the latex to form a rubber coating on the individual grains, and thereafter shaping an abrasive article from the coated grains and vulcanizing the rubber.

3. The method of making a porous rubber bonded abrasive article comprising the steps of mixing abrasive grains with rubber latex proportioned in amount to leave voids between the grains in the completed article, incorporating a vulcanizing agent and an accelerator therewith and coagulating the latex to coat the individual grains with rubber, thereafter shaping an article from the coated grains and vulcanizing the rubber.

4. An article comprising abrasive grains bonded with rubber latex coagulated around the grains and subsequently vulcanized in the presence of a vulcanizing agent to form an abrasive article in which the original substantially uniform grain size is maintained in the finished article.

5. An abrasive article comprising abrasive grains individually coated with rubber coagulated in situ around the grains and vulcanized in the presence of a vulcanizing agent to unite the coated grains into an integral body, said grains being of such size and the amounts of rubber and grains being so proportioned that the structure of the article is open and porous.

Signed at Worcester, Massachusetts, this 29th day of October, 1925.

DUANE E. WEBSTER.